United States Patent
Taylor, Jr. et al.

(10) Patent No.: US 9,353,523 B2
(45) Date of Patent: May 31, 2016

(54) INSULATED WALL PANEL

(71) Applicant: Max Life, LLC, Salisbury, NC (US)

(72) Inventors: Charles David Taylor, Jr., Salisbury, NC (US); Paul Addison Brown, Salisbury, NC (US); Berthold Mueller, Salisbury, NC (US)

(73) Assignee: Max Life, LLC, Salisbury, NC (US)

( * ) Notice: Subject to any disclaimer, the term of this patent is extended or adjusted under 35 U.S.C. 154(b) by 0 days.

(21) Appl. No.: 14/039,101

(22) Filed: Sep. 27, 2013

(65) Prior Publication Data

US 2014/0083040 A1 Mar. 27, 2014

Related U.S. Application Data

(60) Provisional application No. 61/706,148, filed on Sep. 27, 2012.

(51) Int. Cl.
*E04F 13/08* (2006.01)
*E04C 2/288* (2006.01)
*E04C 2/04* (2006.01)
*E04F 13/14* (2006.01)

(52) U.S. Cl.
CPC .............. *E04C 2/04* (2013.01); *E04F 13/0862* (2013.01); *E04F 13/0875* (2013.01); *E04F 13/14* (2013.01); *E04C 2/288* (2013.01)

(58) Field of Classification Search
CPC ... E04F 13/0862; E04F 13/147; E04F 13/141; E04C 2002/007; E04C 2/288
USPC ........ 52/385, 387, 389, 314, 315, 311.3, 316, 52/507, 513
See application file for complete search history.

(56) References Cited

U.S. PATENT DOCUMENTS

| | | | | |
|---|---|---|---|---|
| 2,198,466 A * | 4/1940 | Stolze | ............................. | 52/385 |
| 2,825,221 A * | 3/1958 | Brouk | .......................... | 52/293.1 |
| 3,304,673 A * | 2/1967 | Ramoneda | ................... | 52/220.3 |
| 3,350,827 A * | 11/1967 | Sugar | ........................ | E04C 2/26 156/71 |
| 3,602,476 A * | 8/1971 | Iragorri | ........................... | 249/96 |
| 3,965,635 A * | 6/1976 | Renkert | ........................... | 52/434 |
| 4,031,682 A * | 6/1977 | Renkert | .............. | B28B 19/0053 52/309.3 |
| 4,920,716 A * | 5/1990 | Coffey | .............................. | 52/386 |
| 5,009,387 A * | 4/1991 | Scott et al. | ...................... | 249/96 |
| 5,836,572 A * | 11/1998 | Sugiyama | ........................ | 256/19 |
| 5,839,251 A * | 11/1998 | Weinstein | ................... | 52/749.13 |
| 6,240,691 B1 * | 6/2001 | Holzkaemper et al. | .......... | 52/315 |
| 6,360,505 B1 * | 3/2002 | Johns | ........................... | 52/311.1 |
| 6,516,578 B1 * | 2/2003 | Hunsaker | ........................ | 52/387 |
| 6,857,248 B2 * | 2/2005 | Ouellet et al. | .............. | 52/745.06 |
| 7,165,374 B2 * | 1/2007 | Ohanesian | .................... | 52/783.1 |
| 7,658,050 B2 * | 2/2010 | Bouchard et al. | ........... | 52/745.06 |
| 7,871,054 B2 * | 1/2011 | Walters | ........................... | 249/15 |
| 8,444,789 B2 * | 5/2013 | Guo | ........................ | E04F 13/147 156/247 |
| 8,621,801 B2 * | 1/2014 | Bouchard | ........................ | 52/314 |
| 8,627,625 B2 * | 1/2014 | Bouchard et al. | ................ | 52/387 |
| 2003/0213212 A1 * | 11/2003 | Passeno | ..................... | 52/745.19 |
| 2005/0028476 A1 * | 2/2005 | Bouchard et al. | ............... | 52/596 |
| 2008/0066412 A1 * | 3/2008 | Franco et al. | .................. | 52/506.1 |
| 2014/0069050 A1 * | 3/2014 | Bolin | .......................... | 52/745.21 |

* cited by examiner

*Primary Examiner* — Elizabeth A Quast
(74) *Attorney, Agent, or Firm* — Shumaker, Loop & Kendrick, LLP

(57) ABSTRACT

The invention is an insulated wall panel system having structural elements that may be used as an exterior façade to a building. The insulated wall panel system provides a finished exterior surface, a structural component, and an insulation factor. The wall panel system may be used in new construction or in existing buildings. The wall panel system has an insulation layer, a middle cement layer, and an outer veneer layer. The outer veneer layer may include brick, stone, tile, or other material as a finished surface. The insulated wall panels may be attached directly to the studs or other structural element of a building.

8 Claims, 5 Drawing Sheets

INSULATED WALL PANEL

CROSS-REFERENCE TO RELATED PATENT APPLICATIONS

This application is a non-provisional patent application of and expressly incorporates by reference provisional patent application No. 61/706,148 filed on Sep. 27, 2012.

TECHNICAL FIELD AND BACKGROUND OF INVENTION

The invention relates to the field of building construction materials. More particularly, the invention relates to the field of construction components used in the construction of walls and other planar surfaces for buildings.

Humans have utilized bricks and other hard surfaces as construction components for buildings for thousands of years. The earliest sun dried bricks were made in Ancient Egypt. Later, bricks were dried using a fuel source. The Book of Genesis records that burnt brick was used in the construction of the Tower of Babel. Thus, from ancient times to the present, brick has remained a popular building material.

The enduring presence of brick is due in no small part to its stellar properties as an exterior surface. Bricks are capable of resisting high summer heat as well as cold winters and changes there between. In addition to such thermal properties, brick provides a strong outer shell to a building. Brick resists wind, rain, snow, dust and other detrimental environmental elements. Bricks can be manufactured in a myriad of sizes, textures, and colors. Further, though it need not be painted, when brick is painted, the paint adheres well to the brick.

However, despite such positive characteristics, brick has a few drawbacks, mostly related to installation. For instance, whereas other exterior surfaces may be relatively easily applied to an existing building structure, brick is much more difficult to install on an existing building as an alternate siding choice during a renovation. Further, the laying of brick during the construction of a building is a labor intensive operation. Each brick must be mortared and laid, one on another, brick by brick, by a skilled brick mason. As manual labor prices rise in a given market, so do the costs associated with using brick as a building material.

Thus, there exists a need for a building product that has the same or better building characteristics and aesthetic appeal as traditional brick but also can be applied without the need for an extensive skilled labor team of brick masons. Further, there exists a need for a building product that has the same or better building characteristics and aesthetic appeal as traditional brick that may be used as a retro-fit product for providing a siding to an existing building structure. Further, as energy costs and environmental consciousness increase, so to does the demand for better insulation. Thus, there is also a need for building materials offering improved insulation of a building's envelope.

SUMMARY OF THE INVENTION

The present invention is thus a wall panel system that exhibits many of the same characteristics as traditional brick without the need for extensive labor costs associated with traditional brick masonry. Further, the invention is not limited to new construction applications but may be utilized in existing construction as a retrofit application.

The invention has the same aesthetic appeal as traditional brick and has the same or better engineering benefits. The invention functions as a structural element of the building, a water-resistive barrier, an insulating envelope, and an aesthetic finished exterior surface. The invention is lightweight and energy efficient.

The invention includes an outer veneer layer, a middle cement layer, and an inner insulation layer. The outer veneer layer may be thin brick, stone, tile, or other such material as desired for both aesthetic and engineering appeal. The middle cement layer may be glass fiber reinforced concrete. The inner insulation layer may include a rigid pour foam.

In one embodiment, the inner insulation layer is poured onto and is fixedly attached to the middle cement layer. The outer veneer layer is attached to the middle cement layer with mortar or other cement product.

According to another embodiment, the veneer layer may be attached to the middle layer with a chemical or other construction adhesive. The adhesive may be either one part design or of multi-part design.

According to another embodiment of the invention, the veneer layer may be brick, tile, stone, engineered stone, or other such product as desired for aesthetic purposes. The mortar or other adhesive used to attach the veneer layer may also be used to grout lines between the bricks, stone, or tile of the veneer layer or another product may be applied as a grout.

According to one embodiment of the invention, the middle cement layer may include relief lines or guide lines. The relief lines function to provide a guide when attaching the veneer layer to the cement layer. For example, when the veneer layer uses rectangular brick, the relief lines will be in the shape of the rectangular brick and be just larger than the perimeter of the brick such that the brick fits snuggly inside the relief lines upon application. Similarly, if stone is the veneer layer, the relief lines will match and be just larger than the perimeter of the stone to be installed.

According to another embodiment of the invention, the respective inner layer and middle cement layer are constructed into panels designed to be attached to a building frame. The panels may be attached directly to the studs of a building or they may be attached to some other structural component of the building.

According to another embodiment of the invention, the panels are attached using screws such as structural insulated panel (SIP) screws. The SIP screws attach to the building through holes in the panel. The holes may be countersunk so that the head of the screws is flush with the surface of the panel.

According to another embodiment, attachment points, or other items such as a pvc inlay may be incorporated into middle cement layer. Such items will be of a material that does not negatively impact the performance or other property of the insulation or otherwise cause a conductive source of thermal wicking.

According to another embodiment of the invention, the panels are attached using nails, construction adhesive, bolts, rivets, clasps, or other such attachment devices.

According to another embodiment of the invention, once the panels are attached to the building, the seams between the panels are sealed.

According to another embodiment of the invention, once sealed, the veneer layer is applied over the middle cement layer. During application, mortar or other attachment material is applied over the panels and the brick or other material is fitted between the relief lines. The bricks cover the holes of the SIP screws and also, importantly, cover the seams of the panels. Thus, there are no exposed joints or other openings of the panels.

According to another embodiment of the invention, trim pieces are applied around openings in the building envelope such as around windows and doors. These trim pieces may be in the form of headers and may include various shapes as desired for structural and aesthetic purposes.

According to another embodiment of the invention, corner pieces are attached to the panel ends at corners of the building and then brick or other material as desired is placed over the corner pieces just with the panels.

According to another embodiment of the invention, the panels provide a continuous insulating envelope for the walls of a structure. The inner insulation layer may be one inch and may also be up to or greater than three inches thick. Such insulation may provide the panels with an insulation factor of R7 to R21 or greater depending on various factors of design.

Such an insulation regime applied to outer walls of a structure may, depending on other building and environmental factors such as zoning, building codes, etc. . . . , free up space within stud walls for other building elements such as wiring, plumbing etc. . . . and may also reduce the size studs required for a particular building plan. For instance, whereas 2×6 or 2×8 studs may have been required to achieve a desired insulation factor, by utilizing the invention as an exterior envelope, 2×4 studs may suffice. Similarly, in a retrofit application, where an older building may have little or no insulation, significant insulation, in addition to aesthetic elements, can be gained by applying the invention to the pre-existing building.

BRIEF DESCRIPTION OF THE DRAWINGS FIGURES

Features, aspects, and advantages of a preferred embodiment of the invention are better understood when the detailed description is read with reference to the accompanying drawing, in which.

DETAILED DESCRIPTION

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Referring to FIGS. 1-5, the invention is an insulated wall panel 10 having three layers, 20, 30, and 40. The panel 10 provides a finished aesthetic surface to a building, a structural component to a building, and an insulation factor for a building. As such, the installed wall panel 10 includes an inner layer 20 (which may be an insulation), a middle layer 30 (which may be a cement or other material), and an outer veneer layer 40. The panel 10 may be attached to a building wall 50.

Figure 4:
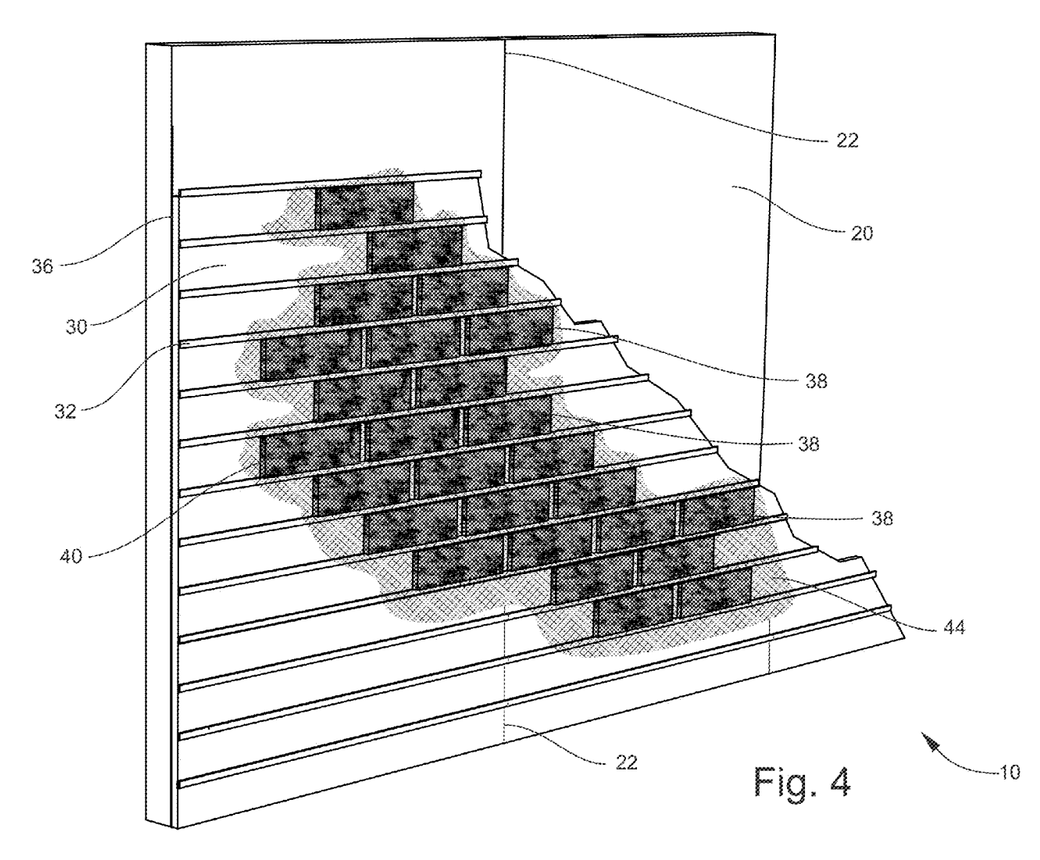
FIG. 4 is perspective view of an embodiment of the invention showing two adjacent panels with the outer veneer layer partially attached and covering the joint between the two adjacent panels.

The outer veneer layer 40 may include brick (as shown in the drawings) but may also include stone, tile, engineered stone, and/or similar material depending on desired finish effect. Thus, the use of the term "brick" herein is synonymous and inclusive of other veneers thus listed. The veneer layer 40 is relatively thin and is attached to the middle layer 30 using mortar 44 or other appropriate material such as a chemical adhesive as best shown in FIG. 4. Each brick (or other material as desired) of the veneer layer 40 is thin and is defined by a perimeter.

The middle layer 30 provides a substrate to which the brick of the veneer 40 is applied upon installation on a building structure 50. The middle layer 30 has a plurality of sets of relief lines 32. Each set of relief lines 32 define a boundary that is just larger than the perimeter of a particular brick of the veneer layer 40 that is to be applied to the middle layer 30. The relief lines 32 may be formed to the thickness of the desired grout 42 spacing between the brick of the veneer layer 40.

The middle layer 30 is made of a cementatious product with a glass fiber reinforcing material embedded therein. The glass fiber has a high strength and is the principal load-carrying member of the middle layer 30 while the cement forms a matrix that allows the fibers to retain their desired location and orientation. The resultant product is thin and strong.

In order to form the middle layer 30, a mold is first constructed into which a slurry of uncured cementatious product of the middle layer 30 is poured. The mold will have the negatives of the relief lines 32 formed therein. These negatives will appear as small trenches within the mold such that when the cement cures and the middle layer 30 is removed from the mold, the relief lines 32 will protrude outward from the otherwise generally planar outer surface 34 of the middle layer. The inner surface 36 of the middle layer 30 will also be generally planar but will not have such relief lines 32. The middle layer 30 may remain in the mold while curing. Curing time is dependent upon the thickness, particulars of the mix design, and the environment in which the cement is being cured. Preferably, the middle cement layer 30 is cured in a chamber.

Once cured, the middle layer 30 is then placed in a fixture that allows the inner layer 20 to be applied and attached to the inner surface 36 of the middle layer 30. The inner layer 20 is a rigid pour foam that is formed from a two part Class I rated urethane. The foam is non-CFC (non-chlorofluorocarbon) and non-HCFC (non-hydrochlorofluorocarbon). The foam is applied to the inner surface 36 of the middle layer 30 using a machine calibrated to deliver proper and consistent component mix. The finished urethane material 20 will have an in place density of approximately 2.2 pounds per cubic foot. The foam 20 adheres to the middle layer 30 such that the machine delivery and mixing of the components provides for a complete bond between the middle layer 30 and inner insulation layer 20. Thus, there are no adhesives or other chemical bonding required to achieve the strength of the final insulated panel 10. The inner layer 20 may be one inch thick or up to three inches thick or greater depending on the level of insulation desired for a particular application.

Alternatively, rather than being poured, the middle layer 30 may be press-molded, extruded, vibration cast, sprayed, or lip formed. If, in alternate embodiments, attachment points or other items are incorporated into the structure they are placed in the mold prior to the injection of the urethane.

Figure 1:
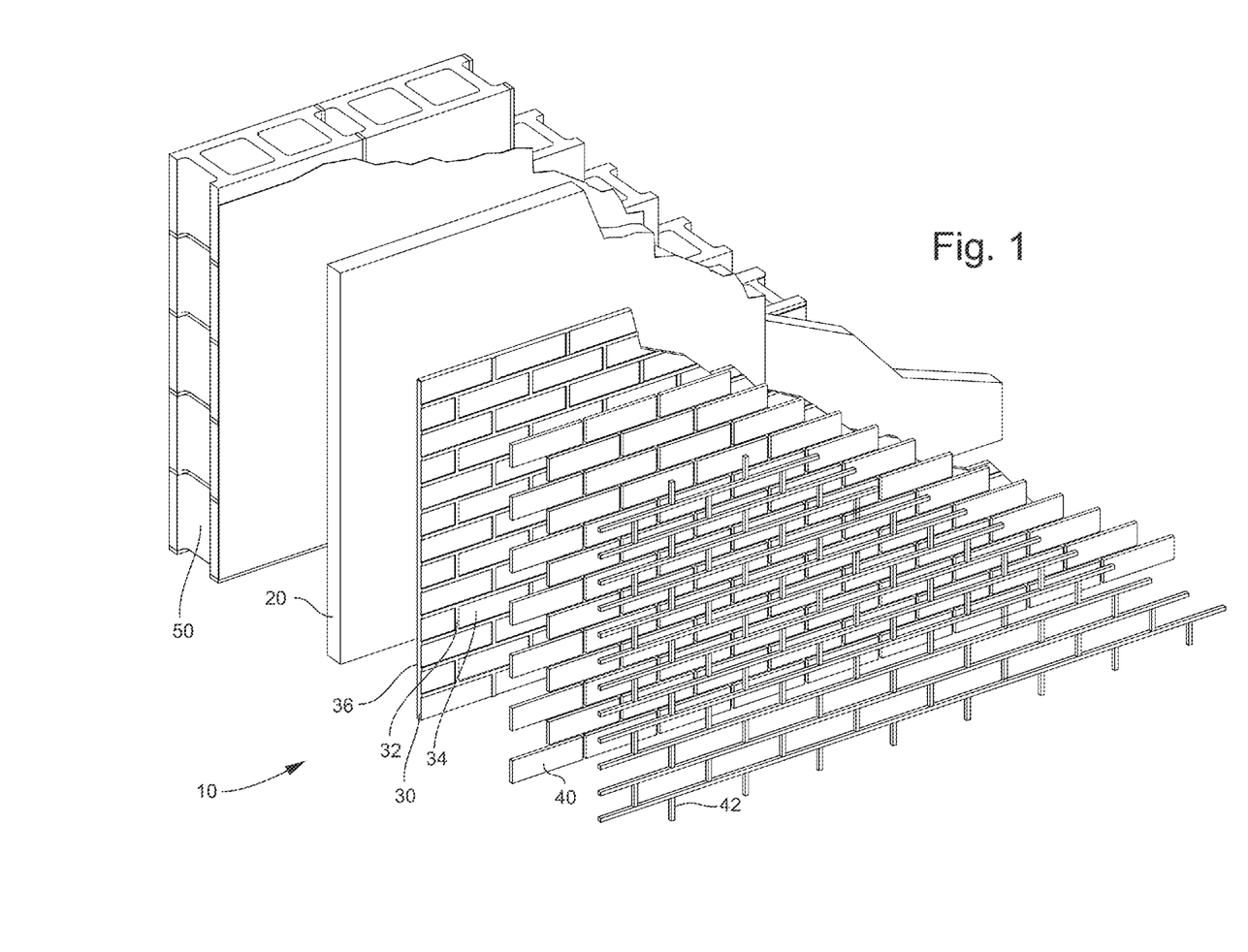
FIG. 1 is an exploded perspective view of an embodiment of the invention showing the layers.
Figure 2:
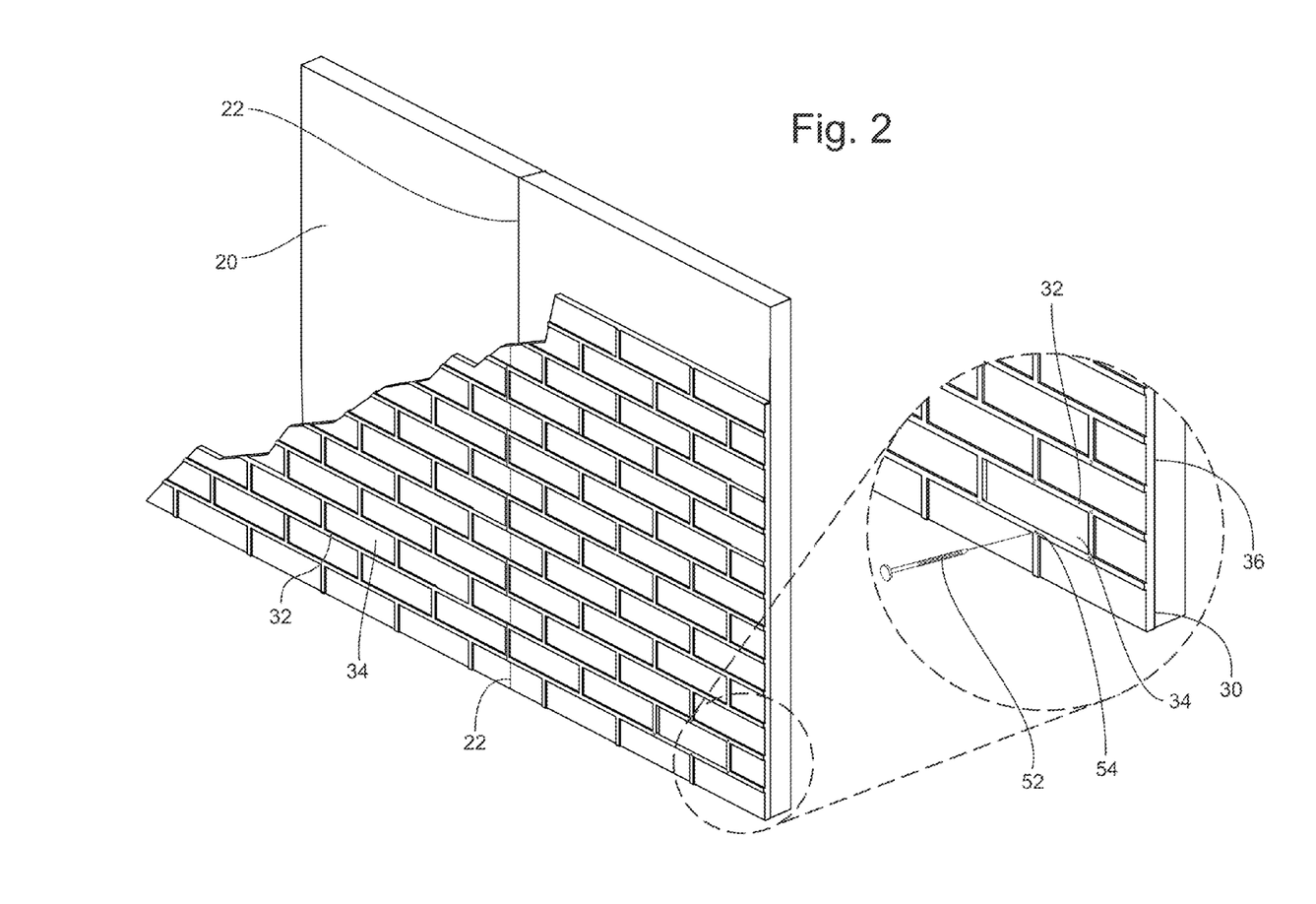
FIG. 2 is a partial perspective view of an embodiment of the invention showing two adjacent panels and highlighting the attachment of the panels to a wall.
Figure 3:
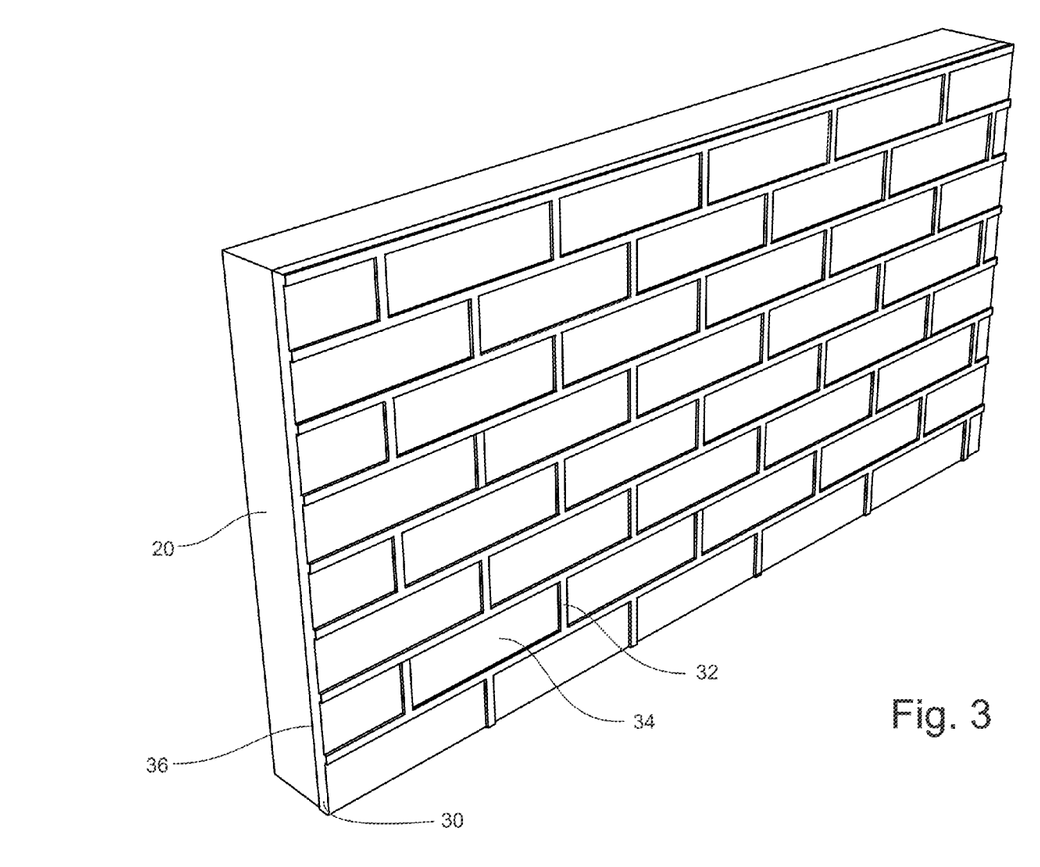
FIG. 3 is a perspective view of an embodiment of the invention showing one panel without the outer veneer layer attached.
Figure 5:
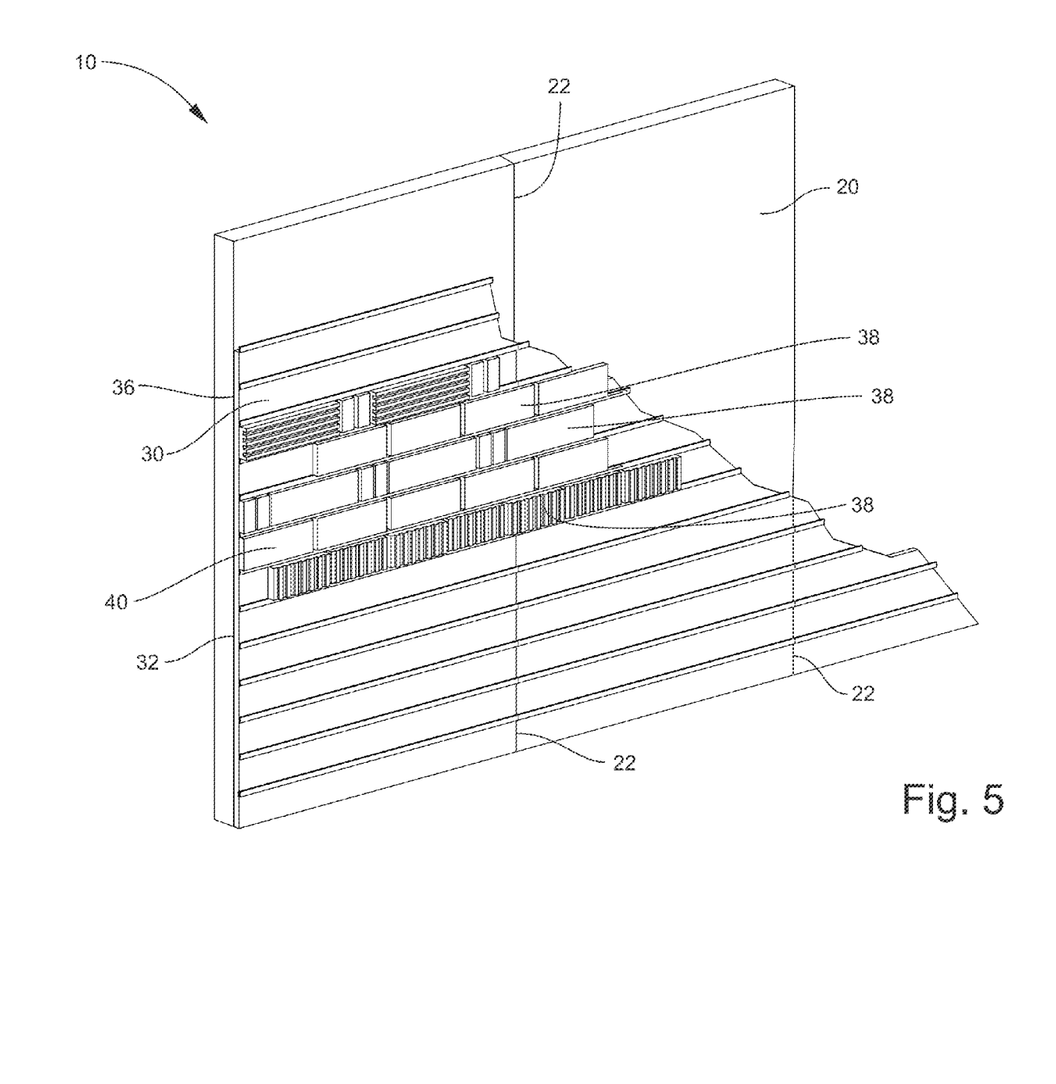
FIG. 5 is a perspective view of an embodiment of the invention showing adjacent panels with the outer veneer layer partially attached and covering the joint between two adjacent panels.

Once the cement and urethane foam of the respective middle 30 and inner 20 layers has cured, the panel 10 is in condition for application to a building 50. As shown in FIG. 2, the panels 10 are screwed with screws 52 to the wall 50 or other structural element of a building. End pieces, headers, and other trim pieces, having been similarly manufactured, are likewise attached to the building. The seams 22 between the respective panels and trim pieces are sealed with a sealing compound, such as LATICRETE® air and water barrier. Next, as shown in FIG. 4, an adhesive such as mortar 44 is applied to the outer surface of the middle layer 30. Next, the brick of the veneer layer 40 are applied on top of the adhesive 44 and between the relief lines 32. The brick of the veneer 40 are applied to overlap 38 the seams 22 in the panels 10. This overlapping 38 of the seams is best shown in FIGS. 4 and 5. Finally, a grout 42 or other material is applied between the gaps in the brick of the veneer 40.

We claim:

1. An insulated wall panel comprising:
   a. a middle layer;
   b. an adhesive;
   c. an outer veneer layer, comprising a plurality of bricks, attachable to a first side of the middle layer via the adhesive; and
   d. an inner insulation layer, comprising a two part rigid urethane pour foam, having a first side chemically bonded to a second side of the middle layer which is parallel to and opposite the first side of the middle layer and a second side which is parallel to and opposite the first side of the inner insulation layer;
   e. wherein the second side of the inner insulation layer directly attaches to a fixed structural building component and wherein the insulated wall panel is characterized by a lack of any additional layer or support element positioned between the inner insulation layer and the fixed structural building component;
   f. wherein the chemical bond between the first side of the inner insulation layer and the second side of the middle layer is formed during a pour by a reaction between each one of the parts of the two part rigid urethane pour foam; and
   g. wherein the plurality of bricks have a thickness that is less than twice the thickness of the middle layer.

2. The insulated wall panel of claim 1 wherein each brick of the plurality of bricks of the veneer layer fits within a boundary defined by a plurality of relief lines of the middle layer.

3. The insulated wall panel of claim 2 wherein the bricks of the plurality of bricks are selected from the group consisting of clay brick, ceramic tile, porcelain tile, natural stone and engineered stone.

4. The insulated wall panel of claim 3 wherein the boundary defined by the plurality of relief lines is larger than an outer perimeter of one of the plurality of bricks.

5. The insulated wall panel of claim 4 wherein the adhesive is selected from the group consisting of mortar, construction adhesive, one part chemical adhesive, and two part chemical adhesive.

6. The insulated wall panel of claim 4 wherein a space between the plurality of bricks and above the plurality of relief lines is filled with a grout selected from the group consisting of cement grout, mortar, construction adhesive, one part chemical adhesive, and two part chemical adhesive.

7. The insulated wall panel of claim 1 wherein the middle layer is made from glass reinforced cement.

8. The insulated wall panel of claim 1 wherein a plurality of the insulated wall panels are attached to a building structure using an attachment selected from the group consisting of: screws, nails, bolts, welds, construction adhesive, rivets, and clasps.

* * * * *

UNITED STATES PATENT AND TRADEMARK OFFICE
CERTIFICATE OF CORRECTION

| | |
|---|---|
| PATENT NO. | : 9,353,523 B2 |
| APPLICATION NO. | : 14/039101 |
| DATED | : May 31, 2016 |
| INVENTOR(S) | : Taylor, Jr. et al. |

Page 1 of 1

It is certified that error appears in the above-identified patent and that said Letters Patent is hereby corrected as shown below:

Title page

Item (72) Inventors: Please add -- Randal Scott Hoffner and Stewart McIntyre Adam as 4$^{th}$ and 5$^{th}$ inventors --.

Signed and Sealed this
Fifth Day of July, 2016

Michelle K. Lee
*Director of the United States Patent and Trademark Office*

UNITED STATES PATENT AND TRADEMARK OFFICE
CERTIFICATE OF CORRECTION

PATENT NO. : 9,353,523 B2  
APPLICATION NO. : 14/039101  
DATED : May 31, 2016  
INVENTOR(S) : Taylor, Jr. et al.

Page 1 of 1

It is certified that error appears in the above-identified patent and that said Letters Patent is hereby corrected as shown below:

Title page

Item (72) Inventors: Please add -- Randal Scott Hoffner and Stewart McIntyre Adams as $4^{th}$ and $5^{th}$ inventors --.

This certificate supersedes the Certificate of Correction issued July 5, 2016.

Signed and Sealed this
Second Day of August, 2016

Michelle K. Lee
*Director of the United States Patent and Trademark Office*